United States Patent
Lu et al.

(10) Patent No.: US 12,025,742 B2
(45) Date of Patent: Jul. 2, 2024

(54) SCANNING FLASH LIDAR WITH MICRO SHUTTER ARRAY

(71) Applicant: BEIJING VOYAGER TECHNOLOGY CO., LTD., Beijing (CN)

(72) Inventors: Yue Lu, Mountain View, CA (US); Youmin Wang, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 859 days.

(21) Appl. No.: 17/121,625

(22) Filed: Dec. 14, 2020

(65) Prior Publication Data

US 2022/0187427 A1     Jun. 16, 2022

(51) Int. Cl.
    *G01C 3/08*      (2006.01)
    *G01B 11/22*    (2006.01)
    *G01S 7/481*    (2006.01)
    *G01S 17/89*    (2020.01)

(52) U.S. Cl.
 CPC ............ *G01S 7/4816* (2013.01); *G01B 11/22* (2013.01); *G01S 7/4817* (2013.01); *G01S 17/89* (2013.01)

(58) Field of Classification Search
 CPC ...... G01S 7/4816; G01S 7/4817; G01S 17/89; G01S 17/894; G01B 11/22
 See application file for complete search history.

(56) References Cited

U.S. PATENT DOCUMENTS

| | | | | |
|---|---|---|---|---|
| 6,229,640 | B1* | 5/2001 | Zhang | G02B 6/357 359/223.1 |
| 6,535,311 | B1* | 3/2003 | Lindquist | G02B 6/3576 359/489.06 |
| 6,901,182 | B2* | 5/2005 | Yeh | G02B 6/353 385/140 |
| 2010/0134662 | A1* | 6/2010 | Bub | H04N 1/195 348/E5.037 |
| 2019/0302246 | A1* | 10/2019 | Donovan | G01S 17/10 |

FOREIGN PATENT DOCUMENTS

| | | | | |
|---|---|---|---|---|
| CN | 100524015 C | * | 8/2009 | ........... G01C 11/025 |
| CN | 109188451 A | * | 1/2019 | ............. G01S 17/08 |
| DE | 102015112296 A1 | * | 2/2017 | ........... G01S 7/4814 |

* cited by examiner

*Primary Examiner* — Mark Hellner
(74) *Attorney, Agent, or Firm* — BAYES PLLC (57) ABSTRACT

Embodiments of the disclosure provide a micro shutter array, an optical sensing system, and an optical sensing method. The optical sensing system includes a transmitter configured to emit an optical signal toward an environment surrounding the optical sensing system, and a receiver configured to receive the optical signal returning from the environment. The receiver further includes a condenser lens, a receiving lens, and a micro shutter array disposed between the condenser lens and the receiving lens. The condenser lens is configured to collimate the optical signal returning from the environment. The micro shutter array is configured to allow only a spatially-selected portion of the optical signal to pass through the micro shutter array at one time. The receiving lens is configured to receive and focus the spatially-selected portion of the optical signal on a photodetector of the receiver.

20 Claims, 7 Drawing Sheets

SCANNING FLASH LIDAR WITH MICRO SHUTTER ARRAY

TECHNICAL FIELD

The present disclosure relates to a light detection and ranging (LiDAR) system, and more particularly to, a micro shutter array for receiving optical signal in the LiDAR system.

BACKGROUND

In a scanning flash LiDAR system, due to the limited transmitter aperture size, typically the outgoing laser divergence is larger than the point cloud resolution of the system. For example, the beam propagation product of the laser aperture size and the laser divergence angle is a constant. Using a 905 nm pulsed laser diode as an example, the emitter junction channel length is 220 um, and the divergence angle is typically 20°. When collimated by a 10 mm diameter MEMS mirror (which is already quite large), a laser beam would have an outgoing beam divergence of 0.44°. Considering the fact that the typical resolution spot size for a high-resolution LiDAR system is required to be <0.05°, it is difficult to further control the divergence angle to the same size level of the resolution spot.

Embodiments of the disclosure address the above problems by including a micro shutter array in the receiver of a LiDAR system.

SUMMARY

Embodiments of the disclosure provide an exemplary optical sensing system. The optical sensing system includes a transmitter configured to emit an optical signal toward an environment surrounding the optical sensing system, and a receiver configured to receive the optical signal returning from the environment. The receiver further includes a condenser lens, a receiving lens, and a micro shutter array disposed between the condenser lens and the receiving lens. The condenser lens is configured to collimate the optical signal returning from the environment. The micro shutter array is configured to allow only a spatially-selected portion of the optical signal to pass through the micro shutter array at one time. The receiving lens is configured to receive and focus the spatially-selected portion of the optical signal on a photodetector of the receiver.

Embodiments of the disclosure also provide an exemplary optical sensing method using a micro shutter array. The method includes receiving an optical signal from an environment. The method further includes collimating, by a condenser lens, the received optical signal to a collimated optical signal. The method additionally includes spatially selecting, by a micro shutter array disposed in a light path of the collimated optical signal, only a portion of the collimated optical signal to pass through the micro shutter array at one time. The method additionally includes focusing, by a receiving lens, the spatially selected portion of the optical signal received from the micro shutter array on a photodetector.

Embodiments of the disclosure further provide an exemplary micro shutter array. The exemplary micro shutter array includes a plurality of micro shutter elements arranged in an array, and a controller coupled to the micro shutter array and configured to control a micro shutter element to be in one of an open and closed state at one time. The micro shutter element includes a static first comb and a movable second comb coupled to the first comb. The micro shutter element also includes an elongated arm extending from and perpendicular to an anchor of the second comb. The micro shutter element additionally includes a light shutting unit attached to the anchor through the elongated arm. A movement of the second comb controls the micro shutter element to switch between the open state and the closed state.

It is to be understood that both the foregoing general description and the following detailed description are exemplary and explanatory only and are not restrictive of the present disclosure, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Embodiments of the present disclosure provide a micro shutter array in a receiver of a LiDAR system. According to one example, the micro shutter array may be disposed between a condenser lens and a receiving lens of the receiver. The micro shutter array may include a plurality of micro shutter elements arranged in a one-dimensional, two-dimensional, or three-dimensional array. Each micro shutter element may include a light shutting unit that is controlled to switch between an open and closed state. Accordingly, when an optical signal is received by the receiver, the micro shutter array may be controlled to allow only a spatially selected portion (e.g., one-tenth, one-twentieth, one-fortieth, etc.) of the optical signal to pass through the micro shutter array at one time and detected by a photodetector of the receiver. In some embodiments, to allow the optical signal to be completely detected, the micro shutter elements collectively corresponding to the field-of-view (FOV) of the receiver may sequentially open and close one-by-one, thereby allowing all the received optical signal to be sequentially detected by the photodetector.

By controlling the optical signal to be received portion-by-portion sequentially, instead of all the optical signal being received simultaneously like other existing flash LiDAR systems, the optical signal detected by the photodetector of the disclosed LiDAR system at any given time may be in a much smaller size. That is, even the outgoing beam divergence of a laser beam is large (e.g., 0.44°), by dividing the received optical signal into multiple portions (e.g., ten portions, twenty portions, forty portions, etc.) and allowing only one portion (or even two or three separate portions if there are, for example, twenty, or forty micro shutter elements) to pass through the micro shutter array to reach the photodetector, the resolution spot size for a high-resolution LiDAR system may be then still achieved (e.g., the detected spot size for every single portion may correspond to an outgoing beam divergence of 0.044°, 0.022°, 0.011°, etc.). That is, the disclosed micro shutter array may advantageously allow a sub-resolution signal to be detected without further increasing the size of the MEMS mirror in a transmitter of a LiDAR system. Other advantages of the disclosed micro shutter array include its easy integration into the existing flash LiDAR systems, without changing much of the other components included in these LiDAR systems.

The features and advantages described herein are not all-inclusive and many additional features and advantages will be apparent to one of ordinary skill in the art in view of the figures and the following descriptions.

The disclosed LiDAR system containing a micro shutter array can be used in many applications. For example, the disclosed LiDAR system can be used in advanced navigation technologies, such as to aid autonomous driving or to generate high-definition maps, in which the optical sensing system can be equipped on a vehicle.

Figure 1:
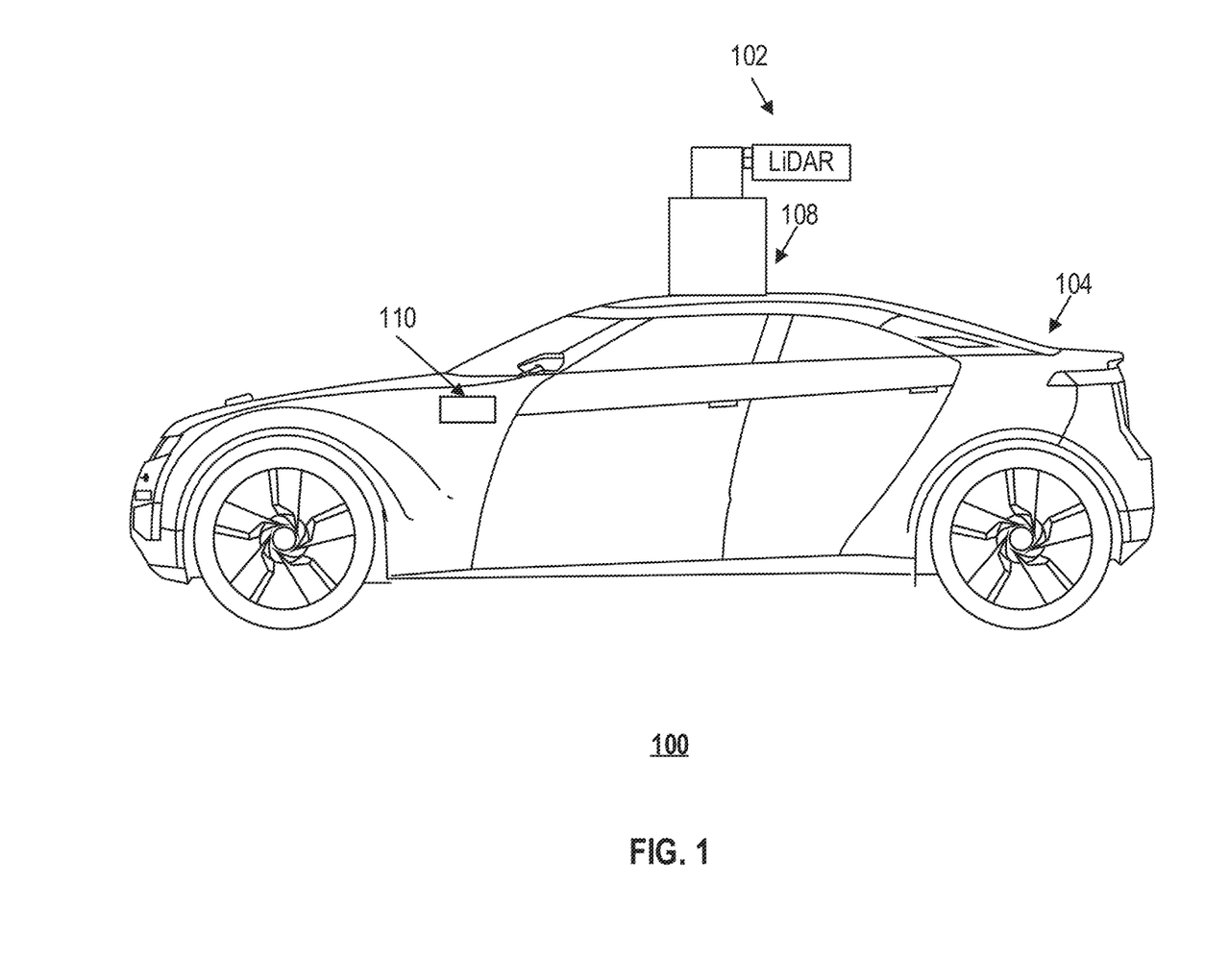
FIG. 1 illustrates a schematic diagram of an exemplary vehicle equipped with a LiDAR system containing a micro shutter array, according to embodiments of the disclosure.

FIG. 1 illustrates a schematic diagram of an exemplary vehicle equipped with an optical sensing system containing a micro shutter array, according to embodiments of the disclosure. Consistent with some embodiments, vehicle 100 may be a survey vehicle configured for acquiring data for constructing a high-definition map or 3-D buildings and city modeling. Vehicle 100 may also be an autonomous driving vehicle.

As illustrated in FIG. 1, vehicle 100 may be equipped with an optical sensing system, e.g., a LiDAR system 102 (also referred to as "LiDAR system 102" hereinafter) mounted to a body 104 via a mounting structure 108. Mounting structure 108 may be an electro-mechanical device installed or otherwise attached to body 104 of vehicle 100. In some embodiments of the present disclosure, mounting structure 108 may use screws, adhesives, or another mounting mechanism. Vehicle 100 may be additionally equipped with a sensor 110 inside or outside body 104 using any suitable mounting mechanisms. Sensor 110 may include sensors used in a navigation unit, such as a Global Positioning System (GPS) receiver and one or more Inertial Measurement Unit (IMU) sensors. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3D sensing performance.

Consistent with some embodiments, LiDAR system 102 and sensor 110 may be configured to capture data as vehicle 100 moves along a trajectory. For example, a transmitter of LiDAR system 102 may be configured to scan the surrounding environment. LiDAR system 102 measures distance to a target by illuminating the target with laser beams and measuring the reflected/scattered pulses with a receiver containing a micro shutter array. The laser beams used for LiDAR system 102 may be ultraviolet, visible, or near-infrared, and may be pulsed or continuous wave laser beams. In some embodiments of the present disclosure, LiDAR system 102 may capture point clouds including depth information of the objects in the surrounding environment, which may be used for constructing a high-definition map or 3-D buildings and city modeling. As vehicle 100 moves along the trajectory, LiDAR system 102 may continuously capture data including the depth information of the surrounding objects (such as moving vehicles, buildings, road signs, pedestrians, etc.) for map, building, or city modeling construction.

Figure 2:
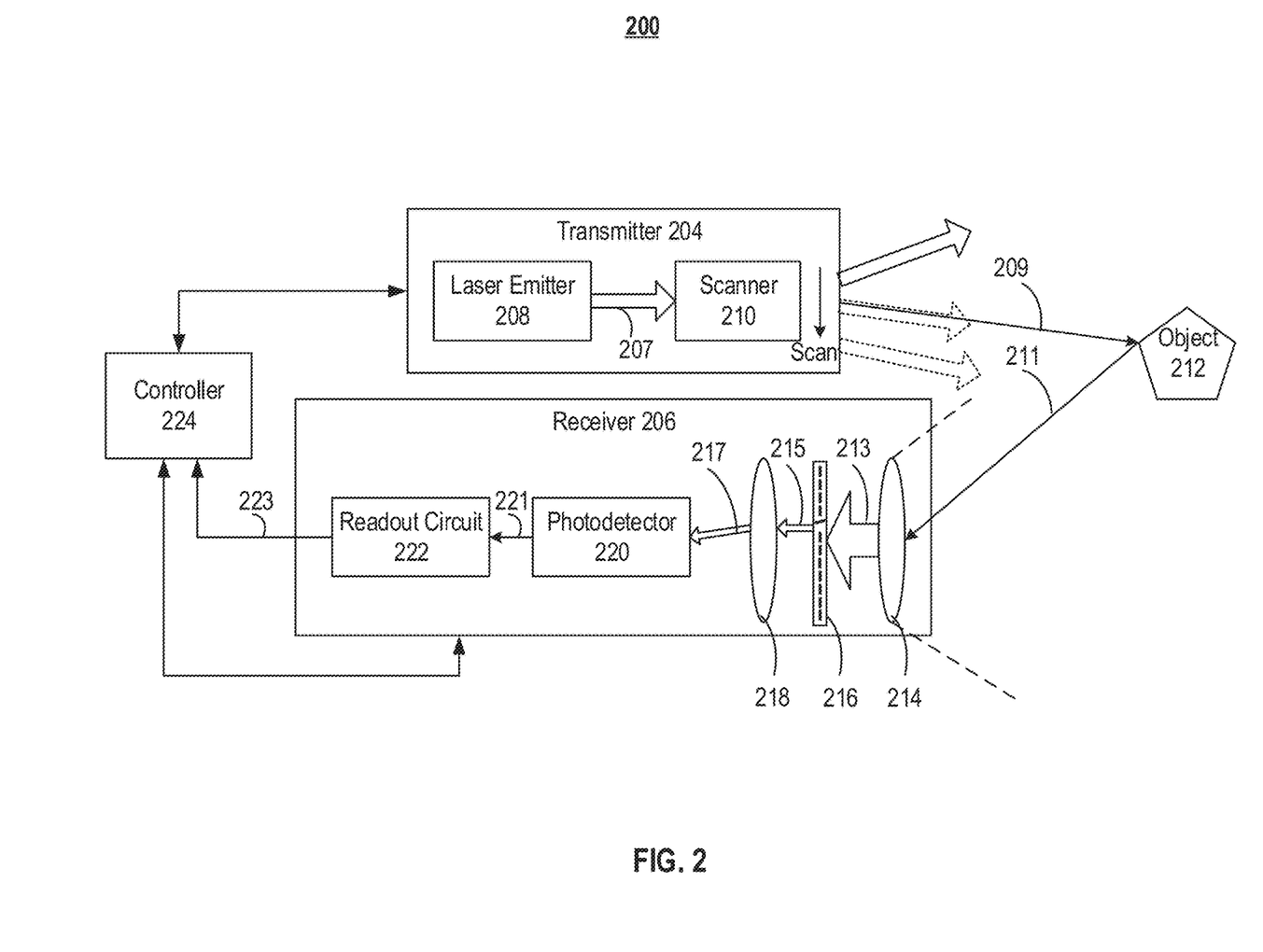
FIG. 2 illustrates a block diagram of an exemplary LiDAR system containing a micro shutter array, according to embodiments of the disclosure.

FIG. 2 illustrates a block diagram of an exemplary LiDAR system containing a micro shutter array, according to embodiments of the disclosure. In some embodiments, LiDAR system 102 may be a scanning flash LiDAR. As illustrated, LiDAR system 102 may include a transmitter 204, a receiver 206, and a controller 224 coupled to transmitter 204 and receiver 206. Transmitter 204 may further include a laser emitter 208 for emitting an optical signal and optics 210 for shaping an emitted optical signal. Receiver 206 may further include a condenser lens 214, a micro shutter array 216, a receiving lens 218, a photodetector 220, and a readout circuit 222.

Transmitter 204 may emit optical beams (e.g., pulsed laser beams, continuous wave (CW) beams, frequency modulated continuous wave (FMCW) beams) along multiple directions. Transmitter 204 may include one or more laser sources (e.g., a laser emitter 208) and one or more optics 210. According to one example, transmitter 204 may sequentially emit a stream of laser beams in different directions within a scan filed-of-view (FOV) (e.g., a range in angular degrees), as illustrated in FIG. 2.

Laser emitter 208 may be configured to provide laser beams 207 (also referred to as "native laser beams") to optics 210. For instance, laser emitter 208 may generate laser beams in the ultraviolet, visible, or near-infrared wavelength range, and provide the generated laser beams to optics 210. In some embodiments of the present disclosure, laser emitter 208 may include a pulsed laser diode (PLD), a CW laser diode, a vertical-cavity surface-emitting laser (VCSEL), a fiber laser, etc. A pulsed or CW laser diode may be a semiconductor device similar to a light-emitting diode (LED) in which the laser beam is created at the diode's junction. Depending on the semiconductor materials of diodes in laser emitter 208, the wavelength of incident laser beams 207 may be at different values, such as 405 nm, between 445 nm and 465 nm, between 510 nm and 525 nm, 532 nm, 635 nm, between 650 nm and 660 nm, 670 nm, 760 nm, 785 nm, 808 nm, 848 nm, 905 nm, 940 nm, 980 nm, 1064 nm, 1083 nm, 1310 nm, 1370 nm, 1550 nm, 1625 nm, 1650 nm, 1940 nm, 2000 nm, etc. It is understood that any suitable laser emitter may be used as laser emitter 208 for emitting laser beams 207 at a proper wavelength.

Optics 210 may include optical components (e.g., lenses, mirrors) that can shape the laser light and collimate the laser light into a narrow laser beam to increase the scan resolution and the range to scan object 212. In some embodiments, transmitter 204 may also include a scanner (not shown) configured to emit laser beams 209 to an object 212 in a range of detection angles (collectively forming the FOV of transmitter 204). In some embodiments, object 212 may be made of a wide range of materials including, for example, non-metallic objects, rocks, rain, chemical compounds, aerosols, clouds, and even single molecules. In some embodiments, at each time point during the scan, a scanner may emit laser beams 209 to object 212 in a direction within a range of scanning angles by rotating a deflector, such as a micromachined mirror assembly.

Receiver 206 may be configured to detect returned laser beams 211 returned from object 212. Upon contact, laser light can be reflected/scattered by object 212 via backscattering, such as Rayleigh scattering, Mie scattering, Raman scattering, and fluorescence. Returned laser beams 211 may be in a same or different direction from laser beams 209. In some embodiments, receiver 206 may collect laser beams returned from object 212 and output signals reflecting the intensity of the returned laser beams.

As illustrated in FIG. 2, receiver 206 may include a condenser lens 214, a micro shutter array 216, and a receiving lens 218. Condenser lens 214 may collect laser beam 211 returning from the environment in the receiver FOV (e.g., from object 212 as illustrated in FIG. 2). Condenser lens 214 may further collimate the received optical signal to a narrow laser beam 213 to increase the detection resolution. Condenser lens 214 may then pass the collimated optical signal to micro shutter array 216. Micro shutter array 216 may not allow the received optical signal to pass through all at once. Instead, micro shutter array 216 may spatially pass the received optical signal portion-by-portion, so that only a portion of the optical signal can be detected by photodetector 220. The detected portion is much smaller than the laser spot size after collimation of condenser lens 214, therefore, the detection resolution of the receiver 206 can be improved. Further descriptions regarding micro shutter array 216 will be provided in detail with reference to FIGS. 3-7. Once passing through micro shutter array 216, the portion of optical signal 215 may reach receiving lens 218. Receiving lens 218 may be configured to focus the passed-through portion of the optical signal on photodetector 220 as a focused laser beam 217.

Photodetector 220 may be configured to detect the focused laser beam 217. In some embodiments, photodetector 220 may convert the laser beam into an electrical signal 221 (e.g., a current or a voltage signal). Electrical signal 221 may be an analog signal which is generated when photons are absorbed in a photodiode included in photodetector 220. In some embodiments, photodetector 220 may include a PIN detector, an avalanche photodiode (APD) detector, a single photon avalanche diode (SPAD) detector, a silicon photo multiplier (SiPM) detector, or the like.

Readout circuit 222 may be configured to integrate, amplify, filter, and/or multiplex signal detected by photodetector 220 and transfer the integrated, amplified, filtered, and/or multiplexed signal 223 onto an output port (e.g., controller 224) for readout. In some embodiments, readout circuit 222 may act as an interface between photodetector 220 and a signal processing unit (e.g., controller 224). Depending on the configurations, readout circuit 222 may include one or more of a transimpedance amplifier (TIA), an analog-to-digital converter (ADC), a time-to-digital converter (TDC), or the like.

Controller 224 may be configured to control transmitter 204 and/or receiver 206 to perform detection/sensing operations. For instance, controller 224 may control laser emitter 208 to emit laser beams 207, or control optics 210 to shape laser beams 209. In some embodiments, controller 224 may also implement data acquisition and analysis. For instance, controller 202 may collect digitalized signal information from readout circuit 222, determine the distance of object 212 from LiDAR system 102 according to the travel time of laser beams, and construct a high-definition map or 3-D buildings and city modeling surrounding LiDAR system 102 based on the distance information of object(s) 212. In some embodiments, controller 224 may be further coupled to micro shutter array 216 to control operation of the micro shutter array, as further described in detail below.

Figure 3:
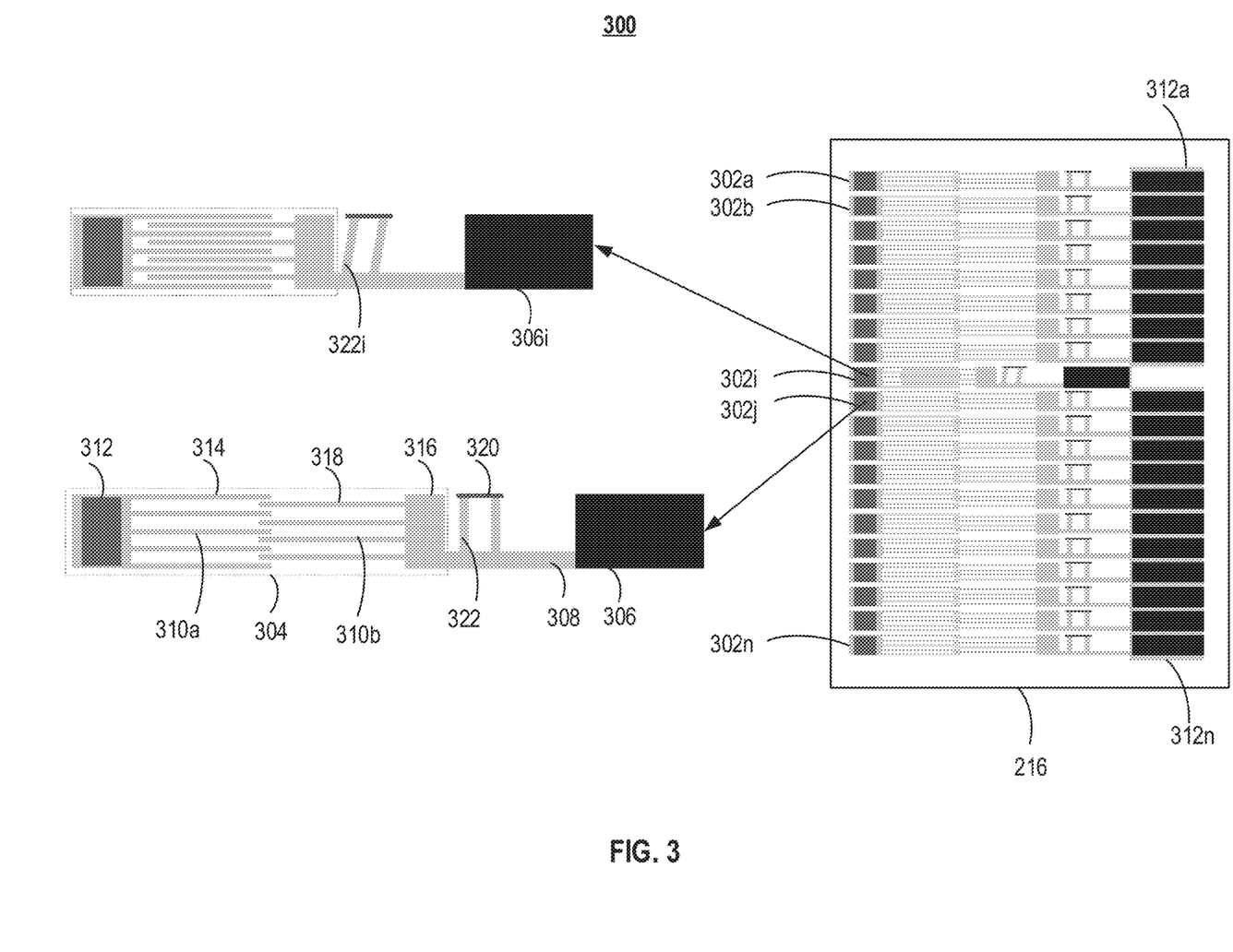
FIG. 3 illustrate a schematic diagram of an exemplary micro shutter array, according to embodiments of the disclosure.

FIG. 3 illustrates a top view of an exemplary micro shutter array and micro shutter elements included in the micro shutter array, according to embodiments of the disclosure. As illustrated in the figure, micro shutter array 216 may include a plurality of micro shutter elements 302a, 302b, . . . , 302n (collectively or individually may be referred to as "micro shutter element 302") arranged in an array. For instance, a plurality of micro shutter elements 302 may be arranged in a one-dimensional array, as illustrated in the figure. In some embodiments, the plurality of micro shutter elements may be arranged in a two-dimensional or a three-dimensional array if properly configured. For ease of illustration, the plurality of micro shutter elements will be described in a one-dimensional array hereinafter. In addition, for ease of illustration, the micro shutter array 216 is not shown to scale.

As will be discussed further below and as illustrated in FIG. 3, the optical signal controlling feature of micro shutter array 216 generally resides in an area covered by the plurality of movable light shutting units 312a, . . . , 312n (collectively or individually may be referred to as "light shutting units 312") in the micro shutter array, as the remaining area outside the plurality of light shutting units generally does not allow the optical signal to pass through. Accordingly, in some embodiments, micro shutter array 216 may additionally include an upper layer (not shown in FIG. 3) over the plurality of micro shutter elements. The upper layer may include one transparent area corresponding to the plurality of light shutting units 312, with the remaining area of the upper layer being reflective or non-transparent. In some embodiments, the transparent area may be coated with glass, or an optical filter that allows only optical signals within certain wavelengths to pass through. This may block certain noise signals from the environment, thereby further improving the sensitivity of receiver 206 of LiDAR system 102.

As illustrated in FIG. 3, each micro shutter element 302 in the micro shutter array 216 may include a comb drive 304 and a light shutting unit 306 attached to comb drive 304 through an elongated arm 308. Each comb drive 304 may include a first comb 310a and a coupled second comb 310b. First comb 310a may include a first anchor 312 and a first set of teeth 314 fixed to the first anchor, and second comb 310b may include a second anchor 316 and a second set of teeth 318 fixed to the second anchor. Consistent with some embodiments, first anchor 312 may be fixed to a substrate (not shown in the figure) that holds and supports micro shutter array 216, and thus is static and is not movable. On the other hand, second anchor 316 is not fixed to the substrate, and thus is movable with respect to first anchor 312. For instance, second anchor 316 may move away from or towards first anchor 312. The movement of the second anchor or the second comb may be driven by a force applied to comb drive 304, as further described in FIG. 4.

Consistent with some embodiments, each tooth in the first or second set of teeth 314/318 may have a predefined width or a width range. Further, the two sets of teeth 314/318 may be also tightly spaced and interleaved with each other when the two combs move close to each other. Accordingly, a gap between adjacent comb teeth may be spaced in a way to ensure that there is no contact between the teeth during the movement of second comb 310b. In some embodiments, the smoothness of the teeth may also be controlled, to allow for tightly-packed formation of the interleaved combs. This may ensure the overall size of the whole comb drive 304 to be scaled down to some extent, which is beneficial for the construction of micro shutter array 216, considering that a good number of micro shutter elements may be arranged in a compact space of a receiver of a LiDAR system.

In some embodiments, the length of each tooth, the overlap between the first and the second set of teeth 314/318 in the absence of force (e.g., shown in the example of micro shutter element 302j in FIG. 3), and the number of teeth on each comb 310a/310b may be selected in consideration of the desired force developed between the two combs 310a and 310b, as well as the desired travel distance of light shutting unit 306. According to one embodiment, the length of each tooth in the first and second sets of teeth 314 and 318 may be at least longer than the width or the latitudinal travel distance of light shutting unit 306 during each movement.

As illustrated in FIG. 3, micro shutter element 302 may further include a third anchor 320, which may be also a stationary anchor fixed to the substrate to support and hold the micro shutter array 216. Further, on one side surface of third anchor 320 facing elongated arm 308, one or more beams 322 may be disposed between third anchor 320 and elongated arm 308. Beams 322 may provide support when second comb 310b and light shutting unit 306 move horizontally. While two beams 322 are illustrated in FIG. 3, the number of beams 322 included in a micro shutter element 302 is not limited and can be one, three, or any other suitable numbers.

In some embodiments, a beam 322 may include a spring structure that deflects when dragged by the movement of second comb 310b towards first comb 310a, as shown by beams 322i in micro shutter element 302i in FIG. 3. The spring structure may act as a spring to restore second comb 310b and the attached light shutting unit 306 to their default positions in the absence of the applied force. In the illustrated micro shutter element 302j, the beams 322 may not deflect when light shutting unit 306 is in a default position (i.e., a position that does not allow an optical signal to pass through from its location in the micro shutter array, and also a position in the absence of force applied to second comb 310b).

In some embodiments, a beam 322 may not include a spring structure or other similar structures, and thus the movement of second comb 310b away from first comb 310a may be also controlled by the force (e.g., a reversal force) applied to second comb 310b. That is, both the movements of second comb 310b towards and away from first comb 310a may be controlled by the force applied to comb drive 304. In such a scenario, since beams 322 are disposed between the stationary third anchor 320 and movable elongated arm 308, to allow beams 322 to follow the movement of elongated arm 308, beams 322 may be rotationally fixed to the stationary third anchor 320 and/or movable elongated arm 308. In some embodiments, the length of beams 322 may be selected to be long enough to accommodate the travel distance of elongated arm 308, while not too long to consume much space of micro shutter array 216.

As previously described, micro shutter element 302 may further include a light shutting unit 306. Light shutting unit 306 may be a piece of reflective shutter/mirror with a top surface coated with a reflective material. The reflective material may have high reflectivity, e.g., over 95%, to ensure that the incident optical signal coming from the environment do not pass through the light shutting unit when it is in the default position. In some embodiments, absorptive materials may be used instead of the reflective material. For instance, under certain circumstances, an optical filter may be used to coat light shutting unit 306. Although illustrated as a rectangular shape in FIG. 3, light shutting unit 306, or at least its coating surface, may be in certain other shapes, such as square, circle, ellipse, etc.

From the above descriptions, it can be seen that micro shutter element 302 may include a light shutting unit 306 coupled to a comb drive 304 capable of moving light shutting unit 306 between a default position (i.e., a position corresponding to a closed state of the corresponding micro shutter element 302, e.g., micro shutter element 302j in FIG. 3) and a retracted position (i.e., a position corresponding to an open state of the corresponding micro shutter element 302, e.g., micro shutter element 302i in FIG. 3). In the illustrated embodiment in FIG. 3, light shutting unit 306i lies in the retracted position, therefore, the optical signal returning from the environment will not reflect by light shutting unit 306i in the retracted position, but rather pass through the corresponding area previously covered by light shutting unit 306i. For all other light shutting units 306, since these units remain at the default positions, the optical signal returning from the environment will reflect off but will not pass-through micro shutter array 216 at the respective locations. In this way, micro shutter array 216 may allow the optical signal to pass through only micro shutter element 302i, but not other micro shutter elements in the array, thereby achieving spatially-selective optical signal pass-through. Specific details regarding how to control switching of light shutting unit 306 from a default position to a retracted position will be provided hereinafter with reference to FIG. 4.

Figure 4:
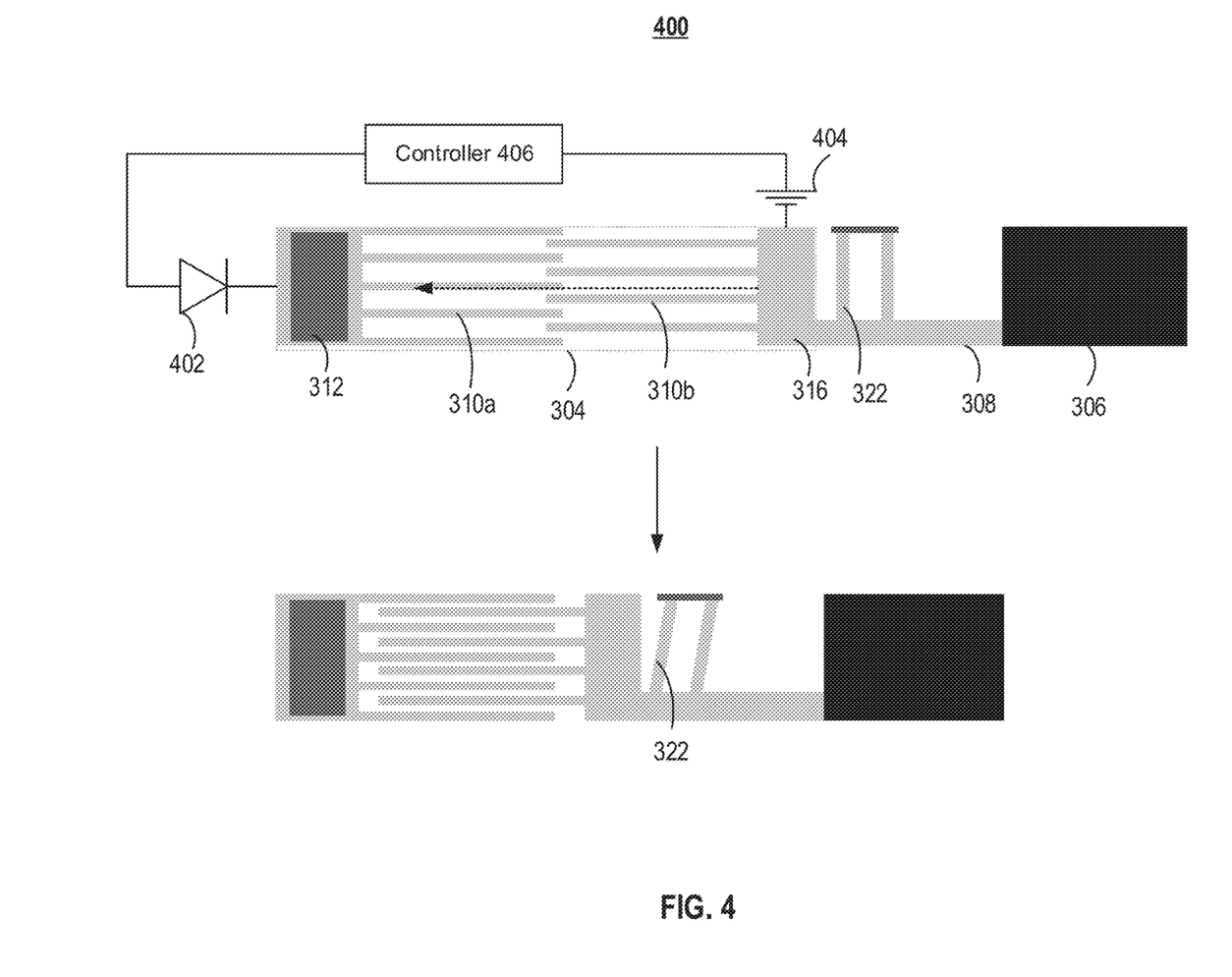
FIG. 4 illustrates a schematic diagram of an exemplary switching mechanism of a micro shutter element, according to embodiments of the disclosure.

FIG. 4 illustrates a schematic diagram of an exemplary switching mechanism of a micro shutter element, according to embodiments of the disclosure. As illustrated, the comb drive 304 in micro shutter element 302 may be coupled to an anode 402 and a cathode 404. For instance, first anchor 312 may be electrically connected to anode 402, while second anchor 316 may be electrically connected to cathode 404. The coupled anode 402/cathode 404 may apply a voltage differential between two combs 310a and 310b, thus creating a force that attracts the two combs to one another. Since first comb 310a is stationary while second comb 310b is movable, second comb 310b may move to first comb 310a due to the created force. The lateral movement of second comb 310b may thus drag light shutting unit 306 to retract from its default position, as exhibited by the lower micro shutter element 302 in FIG. 4.

When the voltage differential applied to the two combs 310a and 310b pauses or terminates, second comb 310b may return to its default position in the absence of applied force, and thus light shutting unit 306 returns to its default position, blocking the light path for the optical signal at its corresponding location. As previously described, in some embodiments, spring structures in beams 322 may drag elongated arm 308, to move sconed comb 310b and light shutting unit 306 back to their default positions. Alternatively, a reverse force may be applied by the coupled anode 402/cathode 404 to move second comb 310b and light shutting unit 306 back to their default positions. Other mechanisms to reverse the movements of second comb 310b and 306 are also possible and are contemplated here. In some embodiments, structures or configurations other than comb drive 304 may be also applied to control the movement of light shutting unit 306.

As also illustrated in FIG. 4, the anode 402 and cathode 404 may be coupled to a controller 406 that controls the voltage differential applied to comb drive 304. For instance, controller 406 may control what type and/or what level of voltage differential should be applied to comb drive 304, and/or at what time the voltage differential should be applied, thereby precisely controlling the movement and switching of light shutting unit 306. In some embodiments, controller 406 for micro shutter array 216 may be the same as controller 224 for LiDAR system 102, as illustrated in FIG. 2. In some embodiments, controller 406 may be separate and independent of controller 224, and is a specialized controller specifically configured for micro shutter array 216.

In some embodiment, controller 406 may be a controller for all micro shutter elements 302 in micro shutter array 216. By controlling each micro shutter element 302 in micro shutter array 216, controller 406 may precisely switch each micro shutter element 302 between an open and closed state, and thus generate a spatial pattern for filtering optical signal through micro shutter array 216. For instance, controller 406 may control the micro shutter elements in micro shutter array 216 to sequentially open, as further described in FIGS. 5-6.

Figure 5:
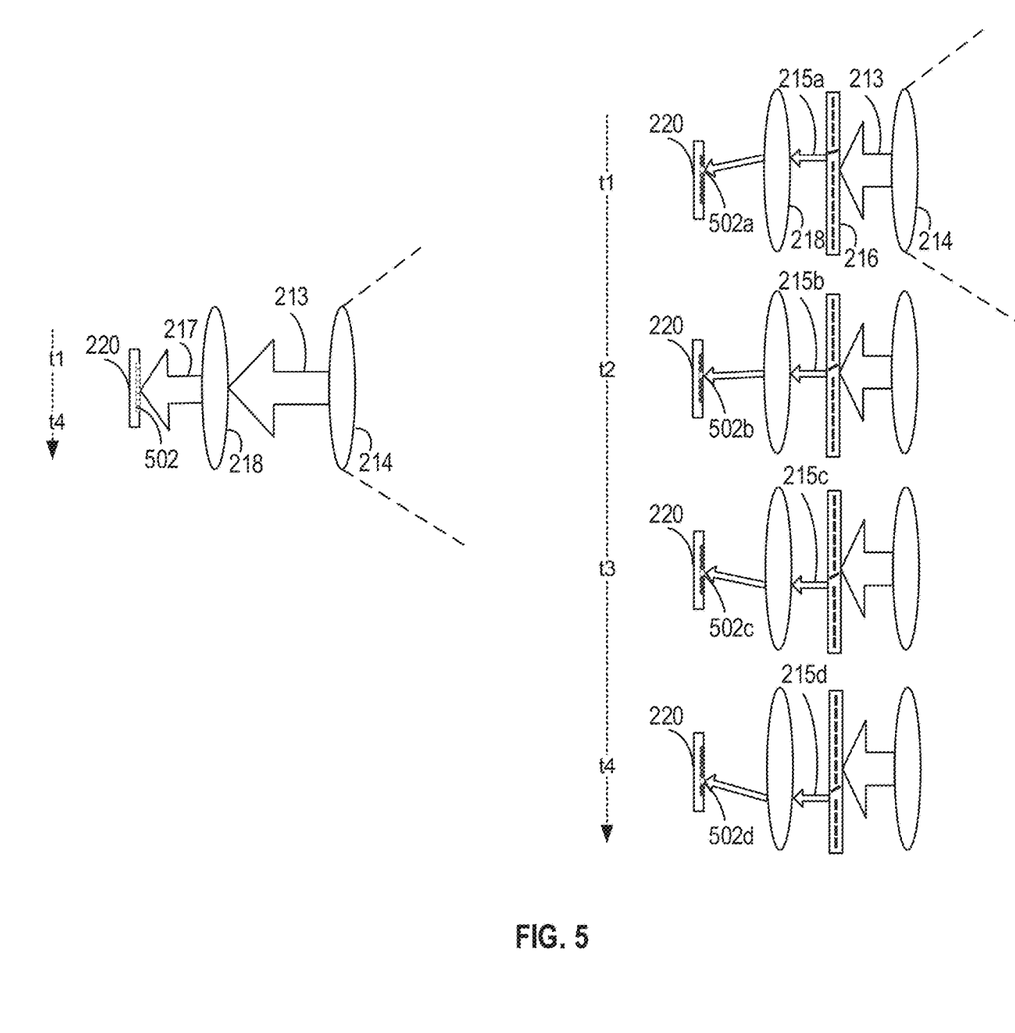
FIG. 5 illustrates a schematic diagram of an exemplary controlling of a micro shutter array, according to embodiments of the disclosure.
Figure 6A:
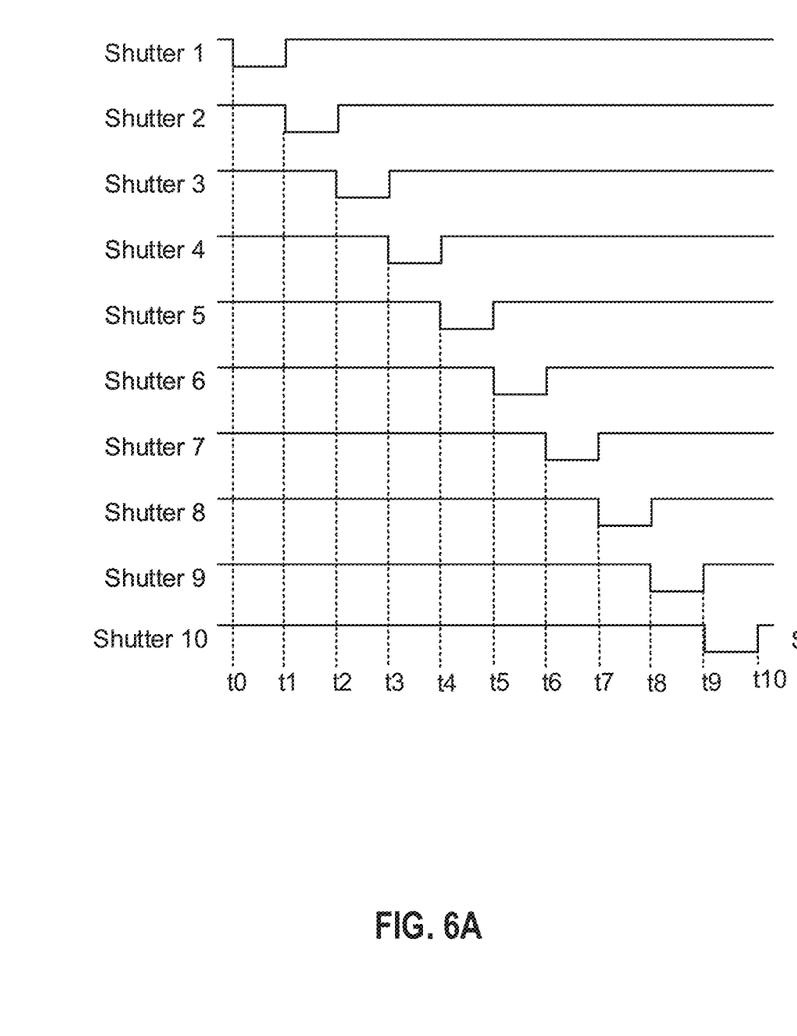
FIGS. 6A-6B illustrate schematic diagrams of exemplary patterns for switching micro shutter elements in a micro shutter array, according to embodiments of the disclosure.
Figure 6B:
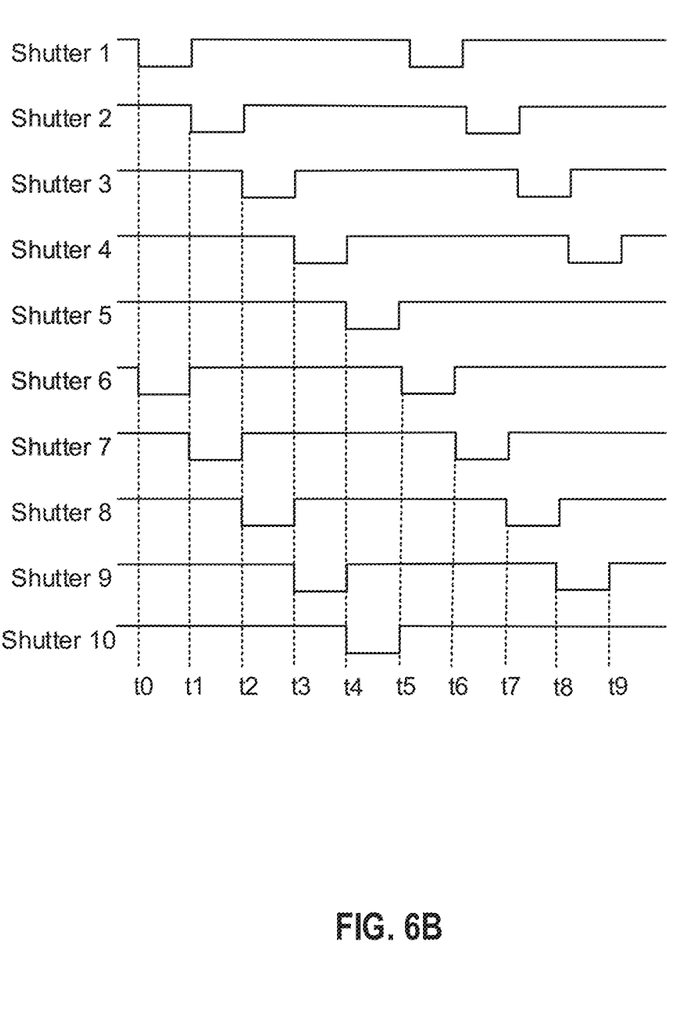

FIG. 5 illustrates a schematic diagram of an exemplary controlling of a micro shutter array, according to embodiments of the disclosure. In the left part of the figure, a part of a LiDAR receiver without a micro shutter array is provided. As illustrated, after optical signal returning from the environment reaches a first lens (e.g., a condenser lens 214) of receiver 206, the optical signal may be collimated into laser beam 213. Laser beam 213 may again pass through a second lens (e.g., receiving lens 218), which may focus laser beam 213 on a photodetector 220 as laser beam 217. As illustrated, photodetector 220 may simultaneously detect an optical signal 502 converged and focused from the whole receiver FOV during a period of t1–t4, which may be not ideal for achieving a high-resolution LiDAR system due to a large spot size collected by photodetector 220, as previously discussed.

On the righthand side of FIG. 5, a part of receiver 206 with a micro shutter array 216 is provided. As illustrated, micro shutter array 216 may sit on a light path (e.g., at the focal plane) of condenser lens 214. The optical signal shining on condenser lens 214 may be first collimated onto micro shutter array 216. Each micro shutter element 302 in micro shutter array 216 may spatially correspond to only a portion (i.e., a sub-resolution FOV) of the signal. Therefore, when there is only one micro shutter element open in the whole array 216, only signal of a sub-resolution FOV portion spatially corresponding to that micro shutter element will pass through micro shutter array 216. For instance, at t1, only a portion 215a of FOV signal passes through micro shutter array 216 and only a sub-resolution FOV signal 502a (which is much smaller in spot size when comparing to the spot size for laser 217 in the LiDAR system in the left part of FIG. 5) is received by photodetector 220; at t2, only a portion 215b of FOV signal passes through micro shutter array 216 and only a sub-resolution FOV signal 502b is received by photodetector 220; at t3, only a portion 215c of FOV signal passes through micro shutter array 216 and only a sub-resolution FOV signal 502c is received by photodetector 220; at t4, only a portion 215d of FOV signal passes through micro shutter array 216 and only a sub-resolution FOV signal 502d is received by photodetector 220, and so on. That is, at any given time, only signal of a sub-resolution FOV, instead of the signal of the whole FOV, is received by photodetector 220. Using this temporal-spatial modulation, sub-resolution may be achieved for detecting the whole FOV optical signal, without necessarily changing an outgoing beam divergence of transmitter 204 in LiDAR system 102.

In some embodiments, to ensure the whole FOV signal to be detected by photodetector 220, a controller (e.g., controller 406) may control micro shutter elements to sequentially open in a predefined pattern and in a timely manner. For instance, as illustrated in FIG. 5, if there are a total of twelve micro shutter elements that collectively correspond to the whole FOV, the twelve micro shutter elements may be sequentially opened and closed during one cycle (e.g., t1 to t12, while only t1 to t4 is illustrated in the figure), to allow photodetector 220 to sequentially detect sub-resolution signal corresponding to each portion of FOV at each moment of t1 to t10. It is contemplated that micro shutter array 216 may include more than twelve micro shutter elements, and those micro shutter elements may be similarly opened and closed sequentially, to allow the detection of the whole FOV laser spot at a sub-resolution.

It is to be noted that, in some embodiments, not all micro shutter elements in a micro shutter array need to be opened and/or closed during a signal detection process. In some embodiments, the number of micro shutter elements constructed for a micro shutter array may be larger than a number required for covering the whole receiver FOV signal in an optical sensing process. For instance, in the illustrated LiDAR system on the righthand side of FIG. 5, may be only ten of the twelve micro shutter elements are sequentially opened and closed in a sensing process.

In some embodiments, if controller 406 and controller 224 are different controllers, controller 406 may communicate with controller 224, to provide necessary information used for controlling micro shutter array 216. For example, the information may include the control scheme specifying the temporal-spatial pattern of the open and close of the micro shutter elements in micro shutter array 216, e.g., which micro shutter element is open at each given time. Controller 224 then incorporates the control information in signal acquisition and analysis, e.g., in constructing a high-definition map or 3-D buildings and city modeling. For instance, controller 224 may orderly combine sub-resolution signals corresponding to each portion of FOV according to the control scheme, to generate a signal corresponding to the whole FOV.

The control scheme can be predetermined and programmed into control 406 or determined/adjusted in real-time based on the sensing application. The control scheme specifies the temporal-spatial pattern that micro shutter elements may be opened or closed. In some embodiments, as illustrated in the righthand side of FIG. 5, micro shutter elements are sequentially opened and closed one-by-one. In some alternative embodiments, however, not all micro shutter elements are sequentially opened and closed one-by-one. Instead, these micro shutter elements may be opened or closed following some other patterns, e.g., more than one element is open at a given time.

FIGS. 6A-6B illustrate schematic diagrams of exemplary patterns for switching micro shutter elements in a micro shutter array, according to embodiments of the disclosure. In FIG. 6A, there may be ten micro shutting elements collectively corresponding to the whole FOV for a LiDAR system. To allow the achievement of sub-resolution of FOV signal, the ten micro shutter elements may be sequentially opened and closed one-by-one during period t0–t10. For instance, micro shutter element #1 (may be also referred to as "shutter 1" as illustrated in FIGS. 6A-6B) may open at t0 and close at t1, shutter 2 may open at t1 and close at t2, . . . , and shutter 10 may open at t9 and close at t10. Such a cycle may be repeated to continuously collect next FOV signal during an optical signal sensing process.

In some embodiments, the open state for each micro shutter element 302 may have a same time length. That is, t2−t1 equals to t1−t0, . . . , and t10−t9 equals to t1−t0, too. In other embodiments, the open state for each micro shutter element 302 may last a different time length. For instance, the time lengths for different micro shutter elements 302 may follow a curved pattern, in which a micro shutter element spatially corresponding to an outer portion may open longer than a micro shutter element spatially corresponding to an inner portion of the FOV signal. In this way, when the returned signal is not incident uniformly (e.g., weaker optical signals from the outer portions than inner portions as exhibited by many existing LiDAR systems), a more uniform signal may be detected for the whole FOV by controlling the time length of each micro shutter element as described herein.

FIG. 6B illustrates another pattern for switching micro shutter elements in a micro shutter array, according to embodiments of the disclosure. As illustrated, instead of opening only one micro shutter element 302 at each time point, controller 406 may control two micro shutter elements to open at the same time, as long as the sub-resolution FOV signal detection is not affected. For instance, if opening both shutters 1 and 6 at the same time does not affect the detection of sub-resolution signals corresponding to the two portions of FOV, the two shutters 1 and 6 may be opened simultaneously. Similarly, shutter pair 2 and 7, 3 and 8, 4 and 9, or 5 and 10 may also open at the same time, while the five pairs may open sequentially pair-by-pair.

In some embodiments, the time length to open a micro shutter element may also vary even when there are more than one micro shutter element open at the same time. Accordingly, even there are always two micro shutter elements that remain open, these two elements may not necessarily open or close at the same time. For instance, at one time point, shutters 1 and 5 may remain open. At a subsequent time point, shutters 1 and 6 may remain open after shutter 5 is closed. Shutter 1 may open longer than shutter 5 due to its coverage of an outer portion of the FOV signal.

It is to be noted that the above-described patterns for switching micro shutter elements in a micro shutter array are merely for illustrative purposes, and not as a limitation of the disclosure. Other patterns of micro shutter element switching are also possible and contemplated.

It is also to be noted that the numbers of micro shutter elements in the illustrated embodiments are merely for illustrative purposes. Other numbers of micro shutter elements included in a micro shutter array are also possible and contemplated. According to one embodiment, the number of micro shutter elements may be larger than the number of subpixels configured for the optical sensing system. In some embodiments, the number of micro shutter array elements may be further increased, to further improve the detection resolution of a LiDAR system. However, such scale-up may also need to take into consideration the limited size of a LiDAR system, as well as the computing capacity of the controller in actual applications, and thus require an optimization process. Once optimized or properly configured, a LiDAR system containing such a micro shutter array may be deployed for actual applications, e.g., for optical sensing.

Figure 7:
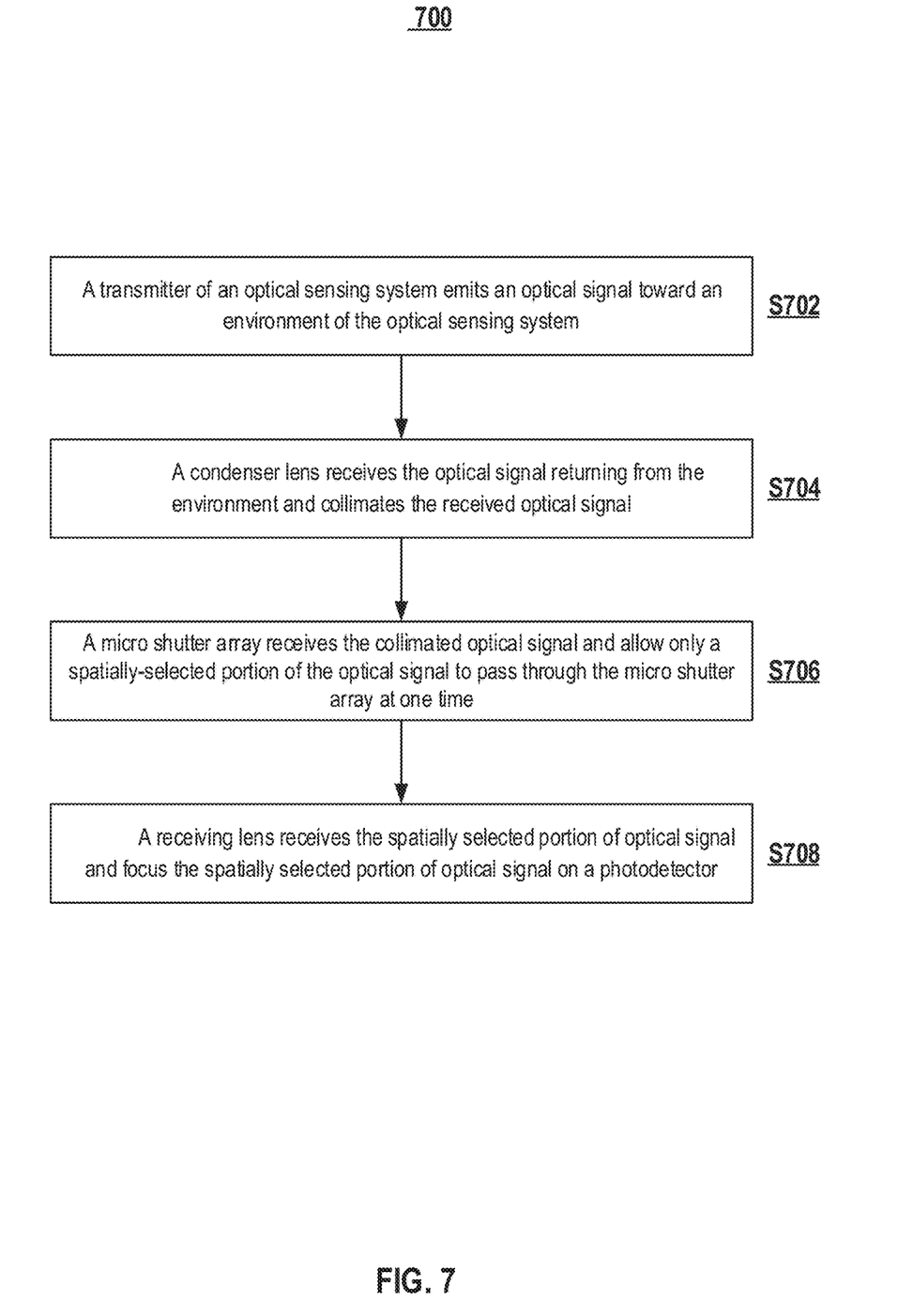
FIG. 7 is a flow chart of an exemplary optical sensing method of a LiDAR system containing a micro shutter array, according to embodiments of the disclosure.

FIG. 7 is a flow chart of an exemplary optical sensing method 700 performed by a LiDAR system containing a micro shutter array, according to embodiments of the disclosure. In some embodiments, method 700 may be performed by various components of LiDAR system 102, e.g., transmitter 204, receiver 206 containing micro shutter array 216, and/or controller 224. In some embodiments, method 700 may include steps S702-S708. It is to be appreciated that some of the steps may be optional. Further, some of the steps may be performed simultaneously, or in a different order than that shown in FIG. 7.

In step S702, a transmitter of an optical sensing system (e.g., transmitter 204 of LiDAR system 102) may emit an optical signal into an environment surrounding the optical sensing system. Here, the optical signal emitted by the transmitter may be first collimated (e.g., by a MEMS mirror with a certain size). The collimated optical signal may be emitted to the environment at a certain divergence. For instance, the divergence may be at a divergence of 0.44° or another divergence. This divergence value may be relatively larger than a value generally required by a high-resolution LiDAR system (e.g., a value of 0.05° or less).

In step S704, a receiver (e.g., receiver 206) of the optical sensing system may receive the optical signal returning from the environment of the optical sensing system. For instance, a condenser lens 214 may receive the returning optical signal reflected from object(s) in the environment. The returning optical signal received by the condenser lens may have a defined FOV for the LiDAR system. In some embodiments, the condenser lens may collimate the received optical signal and pass the collimated optical signal to a micro shutter array (e.g., micro shutter array 216).

In step S706, the micro shutter array (e.g., micro shutter array 216) may receive the collimated optical signal and allow only a spatially-selected portion of the collimated signal to pass through the micro shutter array at one time. As previously described, the micro shutter array may include a plurality of micro shutter elements arranged in a one-dimensional, two-dimensional, or three-dimensional array. A controller coupled to the micro shutter array may control only a small subset (e.g., one, two, etc.) of the plurality of micro shutter elements to open at one time, and thus allow only a spatially-selected portion of the collimated signal to pass through the micro shutter array at such time point. During a short period, the controller may sequentially open the micro shutter elements one-by-one (or two-by-two, or the like) until all the micro shutter elements corresponding to the FOV signal are opened and closed. Implemented in this way may allow only one or a small number of portions of the FOV signal to pass through the micro shutter array at each time point, and thus the signal eventually detected by the photodetector may have a much smaller spot size and thus a higher resolution when compared to a sensing method that allows the whole FOV signal to pass to the photodetector all at once.

In step S708, a receiving lens (e.g., lens 218) may be configured to receive the spatially selected portion of optical signal and focus the spatially selected portion of optical signal on a photodetector (e.g., photodetector 220). The photodetector may detect the received portion of signal and forward the detected portion of signal to other components (e.g., readout circuit 222 and controller 224) of the LiDAR system for further processing. For instance, the readout circuit may convert the received portion of signal to a digital signal and then forward the digital signal to the controller. The controller may then combine the digital signal for the received portion with other digital signals that are converted from the other portions of the FOV signal sequentially passed through the micro shutter array, to generate a combined signal for the whole FOV signal detected by the receiver. In this way, the receiver FOV signal may be continuously detected at a sub-resolution, to allow the achievement of a high-resolution LiDAR system.

Although the disclosure is made using a LiDAR system as an example, the disclosed embodiments may be adapted and implemented to other types of optical sensing systems that use receivers to receive optical signals not limited to laser beams. For example, the embodiments may be readily adapted for optical imaging systems or radar detection systems that use electromagnetic waves to scan objects.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. An optical sensing system, comprising:
a transmitter configured to emit an optical signal toward an environment surrounding the optical sensing system; and
a receiver configured to receive the optical signal returning from the environment, wherein the receiver comprises:
a condenser lens configured to collimate the returned optical signal;
a micro shutter array disposed in a light path of the collimated optical signal, wherein the micro shutter array comprises a plurality of micro shutter elements, wherein each micro shutter element is configured to be actuated by a first comb comprising a first anchor and a second comb comprising a second anchor to allow only a spatially-selected portion of the optical signal to pass through the micro shutter array at one time; and
a receiving lens configured to receive and focus the spatially-selected portion of the optical signal on a photodetector of the receiver.

2. The optical sensing system of claim 1, wherein the plurality of micro shutter elements are arranged in a one-dimensional or two-dimensional array.

3. The optical sensing system of claim 2, wherein each micro shutter element is configured to be in one of an open and closed state at one time.

4. The optical sensing system of claim 3, wherein at least one micro shutter element spatially corresponding to the spatially-selected portion of the optical signal is in the open state.

5. The optical sensing system of claim 3, wherein the plurality of shutter elements are sequentially switched to the open state.

6. The optical sensing system of claim 5, wherein the plurality of shutter elements are sequentially switched to the open state based on a predetermined pattern provided by a controller.

7. The optical sensing system of claim 3, wherein the first comb and the second comb are configured to switch the micro shutter element to the open or closed state.

8. The optical sensing system of claim 7, wherein the first comb is static and the second comb is movable.

9. The optical sensing system of claim 1, wherein the first comb further comprises a first set of teeth fixed to the first anchor, and the second comb further comprises a second set of teeth fixed to the second anchor.

10. The optical sensing system of claim 9, wherein the first set of teeth and the second set of teeth are arranged in a way to allow the second set of teeth to slide past the first set of teeth without a touch.

11. The optical sensing system of claim 9, wherein each micro shutter element further comprises a light shutting unit attached to the second anchor through an elongated arm perpendicular to the second anchor, the elongated arm being disposed on an opposite side of the second anchor with respect to the second set of teeth.

12. The optical sensing system of claim 11, wherein the light shutting unit is coated with a reflective material, to block light from passing through the micro shutter element when the micro shutter element is in the closed state.

13. The optical sensing system of claim 11, wherein each micro shutter element further comprises a third anchor attached with one or more beams, the one or more beams having a first end attached to the elongated arm and a second end attached to the third anchor.

14. The optical sensing system of claim 9, wherein the second anchor is electronically connected to a cathode node, and the first anchor is electronically connected to an anode, the cathode node and the anode being configured to, when a voltage differential is applied between the first comb and the second comb, generate an electrostatic force that applies between the first comb and the second comb to control the second set of teeth to slide past the first set of teeth.

15. The optical sensing system of claim 2, wherein a number of the plurality of micro shutter elements is larger than a number of subpixels configured for the optical sensing system.

16. An optical sensing method using a micro shutter array comprising a plurality of micro shutter elements, wherein each micro shutter element comprises a first comb comprising a first anchor and a second comb comprising a second anchor, the optical sensing method comprising:
receiving an optical signal from an environment;
collimating, by a condenser lens, the received optical signal to a collimated optical signal;
actuating a set of micro shutter elements of the micro shutter array disposed in a light path of the collimated optical signal using their respective first combs and second combs, to spatially select only a portion of the collimated optical signal to pass through the micro shutter array at one time; and
focusing, by a receiving lens, the spatially selected portion of the optical signal received from the micro shutter array on a photodetector.

17. The optical sensing method of claim 16, wherein the plurality of micro shutter elements are arranged in a one-dimensional or two-dimensional array.

18. The optical sensing method of claim 17, wherein the set of micro shutter elements, in the plurality of micro shutter elements, are configured to open and close sequentially when receiving the optical signal returning from the environment.

19. The optical sensing method of claim 18, wherein a number of the set of micro shutter elements corresponds to a laser spot overall size of the returned optical signal.

20. A micro shutter array, comprising:
   a plurality of micro shutter elements arranged in an array; and
   a controller coupled to the micro shutter array and configured to control a micro shutter element to be in one of an open and closed state at one time, wherein the micro shutter element comprises:
   a static first comb and a movable second comb coupled to the first comb;
   an elongated arm extending from and perpendicular to an anchor of the second comb; and
   a light shutting unit attached to the anchor through the elongated arm, wherein a movement of the second comb controls the micro shutter element to switch between the open state and the closed state.

* * * * *